(12) United States Patent
Black et al.

(10) Patent No.: US 10,529,127 B2
(45) Date of Patent: *Jan. 7, 2020

(54) SYSTEM AND METHOD FOR SIMULATING REALISTIC CLOTHING

(71) Applicant: Brown University, Providence, RI (US)

(72) Inventors: Michael J. Black, Tuebingen (DE); Peng Guan, Mountain View, CA (US)

(73) Assignee: BROWN UNIVERSITY, Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/502,718

(22) Filed: Jul. 3, 2019

(65) Prior Publication Data

US 2019/0325641 A1    Oct. 24, 2019

Related U.S. Application Data

(63) Continuation of application No. 16/194,913, filed on Nov. 19, 2018, now Pat. No. 10,347,041, which is a continuation of application No. 15/620,614, filed on Jun. 12, 2017, now Pat. No. 10,134,181, which is a continuation of application No. 14/372,140, filed as application No. PCT/US2013/026312 on Feb. 15, 2013, now Pat. No. 9,679,409.

(60) Provisional application No. 61/599,533, filed on Feb. 16, 2012.

(51) Int. Cl.
*G06T 17/00* (2006.01)
*G06T 19/20* (2011.01)
*G06F 17/50* (2006.01)

(52) U.S. Cl.
CPC .......... *G06T 17/00* (2013.01); *G06F 17/5009* (2013.01); *G06T 19/20* (2013.01); *G06F 2217/32* (2013.01); *G06T 2210/16* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | |
|---|---|---|
| 2001/0026272 A1 | 10/2001 | Feld et al. |
| 2004/0049309 A1 | 3/2004 | Gardner et al. |
| 2010/0111370 A1 | 5/2010 | Black et al. |

(Continued)

OTHER PUBLICATIONS

European Search Report dated Dec. 8, 2015, issued in European Application No. 13749482.9.

(Continued)

*Primary Examiner* — Robert Bader (57) ABSTRACT

A system generates a clothing deformation model which models one or more of a pose-dependent clothing shape variation which is induced by underlying body pose parameters, a pose-independent clothing shape variation which is induced by clothing size and underlying body shape parameters and a clothing shape variation including a combination of the pose-dependent clothing shape variation and/or the pose-independent clothing shape variation. The system generates, for an input human body, a custom-shaped garment associated with a clothing type by mapping, via the clothing deformation model, body shape parameters of the input human body to clothing shape parameters of the clothing type and dresses the input human body with the custom-shaped garment.

20 Claims, 8 Drawing Sheets

(56) References Cited

U.S. PATENT DOCUMENTS

2011/0022372 A1     1/2011    Isogai et al.

OTHER PUBLICATIONS

Tae-Yong Kim et al: "DrivenShape—a Data-driven Approach for Shape Deformation", Eurographics/ ACM SIGGRAPH Symposium on Computer Animation, 2008, pp. 49-55.

Anguelov D et al: "SCAPE: Shape 1-15 Completion and Animation of People", ACM Transactions on Graphics (TOG), ACM, us. vol. 24, No. 3, Jul. 2005 (Jul. 2005). pp. 408-416.

Ofir Weber et al: "Context-Aware Skeletal 1-15 Shape Deformation". Computer Graphics Forum, vol. 26, No. 3, Sep. 2007 (Sep. 2007), pp. 265-274.

Peng Guan et al: DRAPE: DRessing Any PErson 11, 1-15 ACM Transactions on Graphics, vol. 31, No. 4. Jul. 2012 (Jul. 2012), pp. 1-10.

Edilson De Aguiar et al: "Stable spaces 1-15 for real-time clothing", ACM Transactions on Graphics (TOG), ACM, us. vol. 29, No. 4, Jul. 26, 2010 (Jul. 26, 2010), pp. 1-9.

International Search Report of PCT/US2013/026312 dated Apr. 26, 2013.

Pascal Volino, Nadia Magnenat-Thalmann, "Resolving Surface Collisions through Intersection Contour Minimization", Jul. 2006, ACM Transactions on Graphics (TOG)—Proceedings of ACM SIGGRAPH 2006, vol. 25, Issue 3, pp. 1154-1159.

Frederic Cordier, Nadia Magnenat-Thalmann, "A Data-Driven Approach for Real-Time Clothes Simulation", Jun. 2005, Blackwell Publishing, Computer Graphics Forum, vol. 24 (2005), No. 2, pp. 173-183.

Arnulph Fuhrmann, Clemens GroB, Volker Luckas, Andreas Weber, "Interaction-free dressing of virtual humans", Jan. 2003, Elsevier, Computers & Graphics, vol. 27, (2003), pp. 71-82.

Huamin Wang, Florian Hecht, Ravi Ramamoorthi, James O'Brien, "Example-Based Wrinkle Synthesis for Clothing Animation", Jul. 02010, ACM Transactions on Graphics (TOG)—Proceedings of ACM SIGGRAPH 2010, vol. 29, Issue 4, Article No. 107.

Pascal Volino, Nadia Magnenat-Thalmann, Shen Jianhua, Daniel Thalmann, "The Evolution of a 3D System for Simulating Deformable Clothes on Virtual Actors", 1998, MIRALab.

Yueqi Zhong, Bugao Xu, "Three-dimensional Garment Dressing Simulation", 2009, SAGE Publications, Textile Research Journal, vol. 79, No. 9, pp. 792-803.

SYSTEM AND METHOD FOR SIMULATING REALISTIC CLOTHING

CROSS REFERENCE TO RELATED APPLICATIONS

This application is a continuation of Ser. No. 16/194,913, filed Nov. 19, 2018, which is a continuation of U.S. patent application Ser. No. 15/620,614, filed Jun. 12, 2017, now U.S. Pat. No. 10,134,181, issued Nov. 20, 2018, which is a continuation of U.S. patent application Ser. No. 14/372,140, filed Jul. 14, 2014, now U.S. Pat. No. 9,679,409, issued Jun. 13, 2017, which is a national phase application of and claims priority to PCT/US2013/026312, filed Feb. 15, 2013, which claims priority to U.S. provisional application No. 61/599,533, filed on Feb. 16, 2012, which are expressly incorporated by reference herein in their entirety.

STATEMENT REGARDING FEDERALLY SPONSORED RESEARCH OR DEVELOPMENT

This invention was made with Government support under N00014-10-C-0172 awarded by Office of Naval Research and R01 NS066311 awarded by National Institutes of Health. The Government has certain rights in the invention.

BACKGROUND

1. Technical Field

The present disclosure relates to clothing models and more specifically to systems and methods for simulating realistic clothing on bodies of any shape and pose.

2. Introduction

The ability to dress animated characters is extremely useful for the film, gaming, and on-line fashion industries, among others. Recently, there has been an increasing interest in representing the shape and dynamics of human clothing for animation. Physically based simulation (PBS) has been widely used to model the complex behavior of cloth, as it can produce highly realistic clothing simulations.

Unfortunately, PBS simulations require high resolution meshes to represent details, such as folds and wrinkles; complicated non-linear functions to capture the physical properties of fabric; and time-consuming collision handling operations to achieve realism. More significantly, PBS simulations are inflexible and have very limited applications. For example, the results of PBS simulation are specific to a particular body model, and do not readily generalize to new body shapes. Thus, in order to clothe people of a variety of shapes with PBS, separate simulations must be performed for every person. This can be a significantly onerous process.

Another fundamental problem with PBS, which garment designers often struggle with, is the nontrivial task of choosing clothing sizes and constructing two-dimensional (2D) pattern designs for three-dimensional (3D) characters. Here, garment designers typically have to redesign 2D patterns based on anthropometric measurements for characters of different shapes. Not surprisingly, as the number of characters and shapes increases, the amount of work, time, and expenses invested by garment designers in redesigning 2D patterns similarly increase to overwhelming or even unfeasible levels.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for simulating realistic clothing. The system generates a clothing deformation model for a clothing type, wherein the clothing deformation model factors a change of clothing shape due to rigid limb rotation, pose-independent body shape, and pose-dependent deformations. Next, the system generates a custom-shaped garment for a given body by mapping, via the clothing deformation model, body shape parameters to clothing shape parameters. The given body can be a model of a human body, such as a parameterized model of a human body with known shape and pose parameters. For example, the given body can be a shape completion and animation of people (SCAPE) model used to represent the naked body. The custom-shaped garment can be the same type as the clothing type. For example, if the clothing deformation model is for a T-shirt, then the custom-shaped garment can be a T-shirt as well. The clothing type can include a T-shirt, a long-sleeved shirt, a skirt, a sweater, a coat, a jacket, a costume, an undershirt, shorts, long pants, and so forth.

The system then automatically dresses the given body with the custom-shaped garment. The given body can be automatically dressed by simulating realistic clothing on the given body without manual intervention. When automatically dressing the given body, the custom-shaped garment can be warped to lay entirely outside the given body. For example, the custom-shaped garment can be warped by minimizing a measure of cloth-body interpenetration with respect to vertices associated with the custom-shaped garment and/or regularizing the custom-shaped garment to make the custom-shaped garment deform plausibly.

The clothing deformation model allows realistic clothing to be simulated on any body and in any pose. Moreover, the clothing deformation model can automatically adapt to the given body and any other new bodies. For example, in some embodiments, the system can generate, via the clothing deformation model, custom-shaped garments for a plurality of bodies having a plurality of shapes and poses. The system can then automatically dress the plurality of bodies with the custom-shaped garments. In some aspects, the system can automatically generate the custom-shaped garments based on the clothing deformation model and a plurality of respective parameters of the bodies, for example. Further, the custom-shaped garments can include various clothing types. Thus, the clothing deformation model can be applied to automatically generate realistic clothing simulations for any number of different bodies, with any number of different shapes, in any number of different poses, and any number of different clothing types.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to generate a clothing model for simulating realistic clothing on bodies of any shape and pose. A system, method and computer-readable media are disclosed which simulate realistic clothing. A brief introductory description of a basic general purpose system or computing device in FIG. 1, which can be employed to practice the concepts, is disclosed herein. A more detailed description and variations of generating a clothing model and simulating realistic clothing will then follow. These variations shall be described herein as the various embodiments are set forth. The disclosure now turns to FIG. 1.

Figure 1:
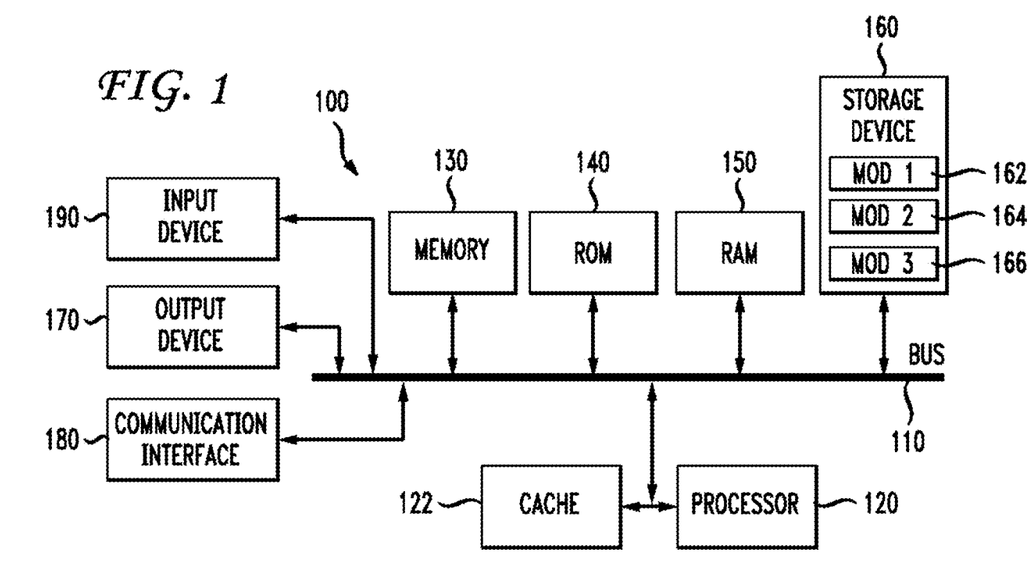
FIG. 1 illustrates an example system embodiment.

With reference to FIG. 1, an example system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the example embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
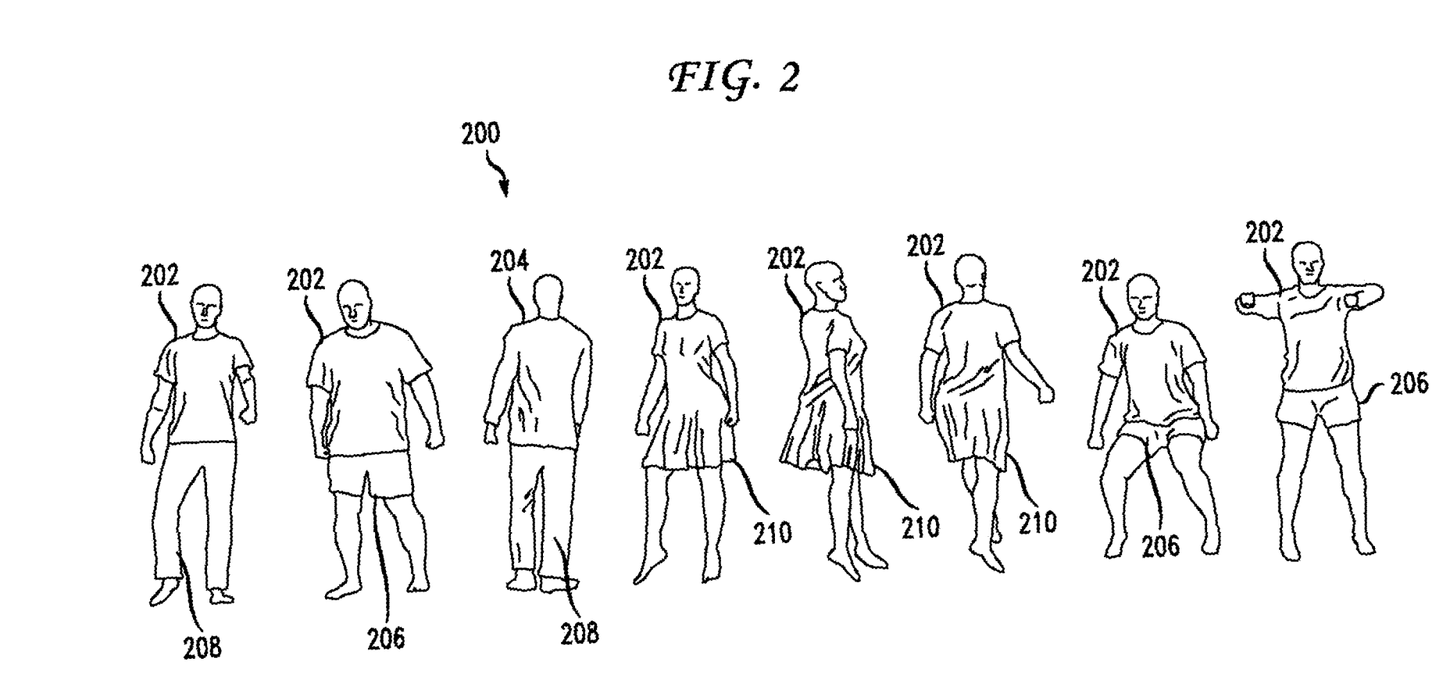
FIG. 2 illustrates an example of men and women with different body shapes and poses wearing realistic clothing.

Having disclosed some components of a computing system, the disclosure now turns to FIG. 2, which illustrates an example of men and women 200 with different body shapes and poses wearing realistic clothing. The men and women 200 can be animations, which can be realistically dressed via a clothing deformation model, such as a DRessing Any PErson (DRAPE) model. A DRAPE model can be a learned model of clothing that allows people of any shape to be dressed in any pose and clothing type. Here, realistic clothing shape variation can be obtained without physical simulation, and dressing a body can be done automatically at run-time. Moreover, DRAPE can be a deformable clothing model that automatically adapts to new bodies. Once the DRAPE model is learned for a particular type of clothing, it can be used to dress any person, of any shape and in any pose, in that clothing. Unlike the PBS methods, users do not need to choose appropriate sizes and initial positions of cloth pieces before clothing fitting. Notably, the DRAPE model can reshape the garment to fit the particular body, and "drape" it automatically. Also, pattern design can be completely separated from the process of dressing bodies, and can be done by professional pattern makers before training the model. Consequently, users do not have to know about pattern design. Thus, the DRAPE model can be quick and flexible, which enables much broader applications of clothing simulation.

In FIG. 2, the men and women 200 are shown in different poses wearing realistic clothing, including T-shirts 202, long-sleeved shirts 204, shorts 206, long pants 208, and skirts 210. The DRAPE model can be generated for each type of realistic clothing 202-210, and used to dress the men and women 200 in that particular clothing. The DRAPE model can also be applied to other poses and/or types of realistic clothing than those illustrated in FIG. 2. The example poses and realistic clothing 202-210 in FIG. 2 are provided for illustration purposes.

Figure 3:
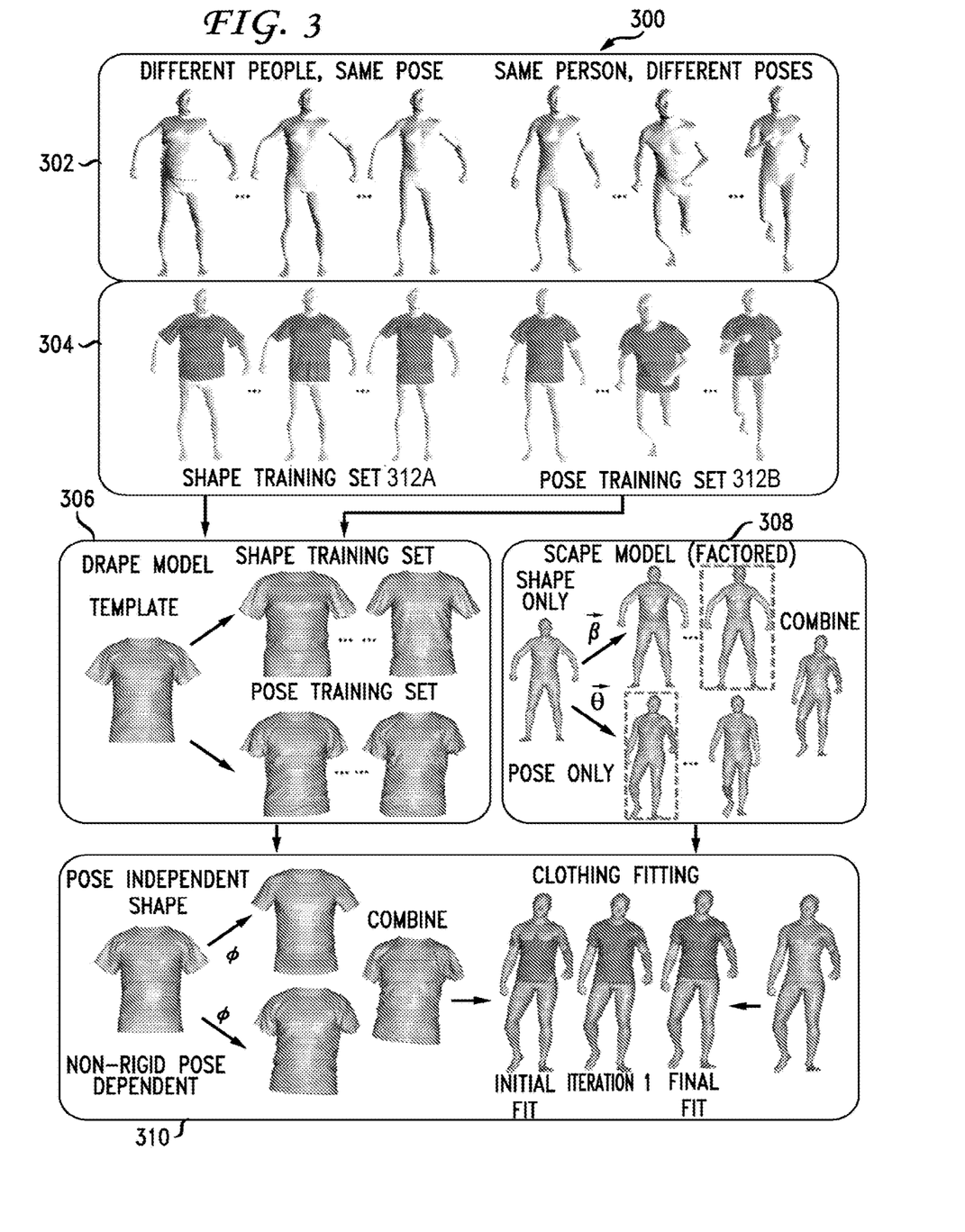
FIG. 3 illustrates an example system for simulating realistic clothing.

FIG. 3 illustrates an example system 300 for simulating realistic clothing. The system 300 can include training data; including a pose training set 302 and a physically-based simulation training set 304; a learned clothing deformation model, including a DRAPE model 306 and a factored shape completion and animation of people (SCAPE) model 308; and a virtual fitting feature 310. In some embodiments, the system 300 can also include a pattern design component. For example, patterns can be designed for specific clothing types, such as T-shirts, shorts, skirts, costumes, long sleeved shirts, long pants etc. The patterns can be graded to allow the system 300 to generate multiple sizes of each type of clothing. Moreover, the system 300 can be applied for virtually any type of clothing. However, in FIG. 3, a T-shirt is used for illustration purposes.

The training data can include a pose training set 302 and a physically-based simulation training set 304. The pose training set 302 can include different people in the same pose, and the same person in different poses. The different people can be of different shapes and sizes. On the other hand, the physically-based simulation training set 304 can include a shape training set 312A and a pose training set 312B. The shape training set 312A can include bodies, such as SCAPE bodies, with different shapes and in the same pose, and the pose training set 312B can include a body in different poses. For example, the pose training set 312B can include a body shape moving through a sequence of poses. The system 300 can select a size for each garment and body shape, and dress the bodies in the physically-based simulation training set 304 using PBS. The system 300 can then use the resulting clothing examples as the training data for the learned clothing deformation model.

The learned clothing deformation model can include the DRAPE model 306 and the factored SCAPE model 308. The DRAPE model 306 can factor rigid pose, pose-independent shape variation, and/or pose-dependent shape deformation. Thus, for each clothing type, the factored clothing model, DRAPE model 306, can represent rigid rotation $\vec{\theta}_c$ of cloth pieces (e.g., the rotation of a sleeve with respect to the torso); pose-independent clothing shape variations induced by clothing size and underlying body shape $\vec{\beta}$, which can be learned from the shape training set 312A; and/or pose-dependent non-rigid deformations, which can be learned from the pose training set 312B. The pose-independent clothing shape variations can be calculated using linear regression functions from body shape to clothing shape, for example. Moreover, dynamics can be implemented when calculating pose-dependent non-rigid deformations, for a better representation of the wrinkles induced by movement, and improved realism of clothing synthesis.

The factored SCAPE model 308 can be used to represent the underlying naked body. The factored SCAPE model 308 can represent the shape of the naked body and the pose of the naked body. The shape of the naked body can be combined with the pose of the naked body to generate a representation of a naked body shape and pose.

The virtual fitting feature 310 can automatically dress one or more bodies based on the learned clothing deformation model. Given an input body, the virtual fitting feature 310 can generate an appropriate clothing configuration according to the body shape and pose. First, the body shape parameters $\vec{\beta}$ can be mapped to the clothing shape parameters $\vec{\phi}_c$, to obtain a custom-shaped garment for the given body. Clothing parts can be associated with body parts and the pose of the body can be applied to the garment parts by rigid rotation. The learned model of pose-dependent wrinkles can then be applied. The custom garment can be automatically aligned with the body, and a very efficient step of solving linear systems can be applied to remove any interpenetration between the garment and the body, as further detailed in the discussion of FIG. 8, below.

The learned clothing deformation model can factor the change of clothing shape due to rigid limb rotation, pose-independent body shape, and/or pose-dependent deformations. This can allow clothing deformations induced by different causes to be combined. For example, the pose-independent shape of clothing can be fixed, and a motion sequence can be generated by changing the poses. This can be beneficial, for example, in applications where the body shape is not known in advance, such as a retail clothing application, where users create different 3D bodies. This can also be useful for animating many bodies of different shapes, since the process can remove the labor involved in creating and/or finding an appropriately fitting garment.

The system 300 for simulating realistic clothing can provide full automation and realism of clothing simulations, which can be implemented in various applications, such as gaming, virtual fashion, on-line retail clothing, computer vision, animation, web design, film, etc. For example, the system 300 for simulating realistic clothing can be implemented in retail applications of "virtual try on," as the system 300 can provide fully automatic dressing of a person with low computational overhead.

Figure 4:
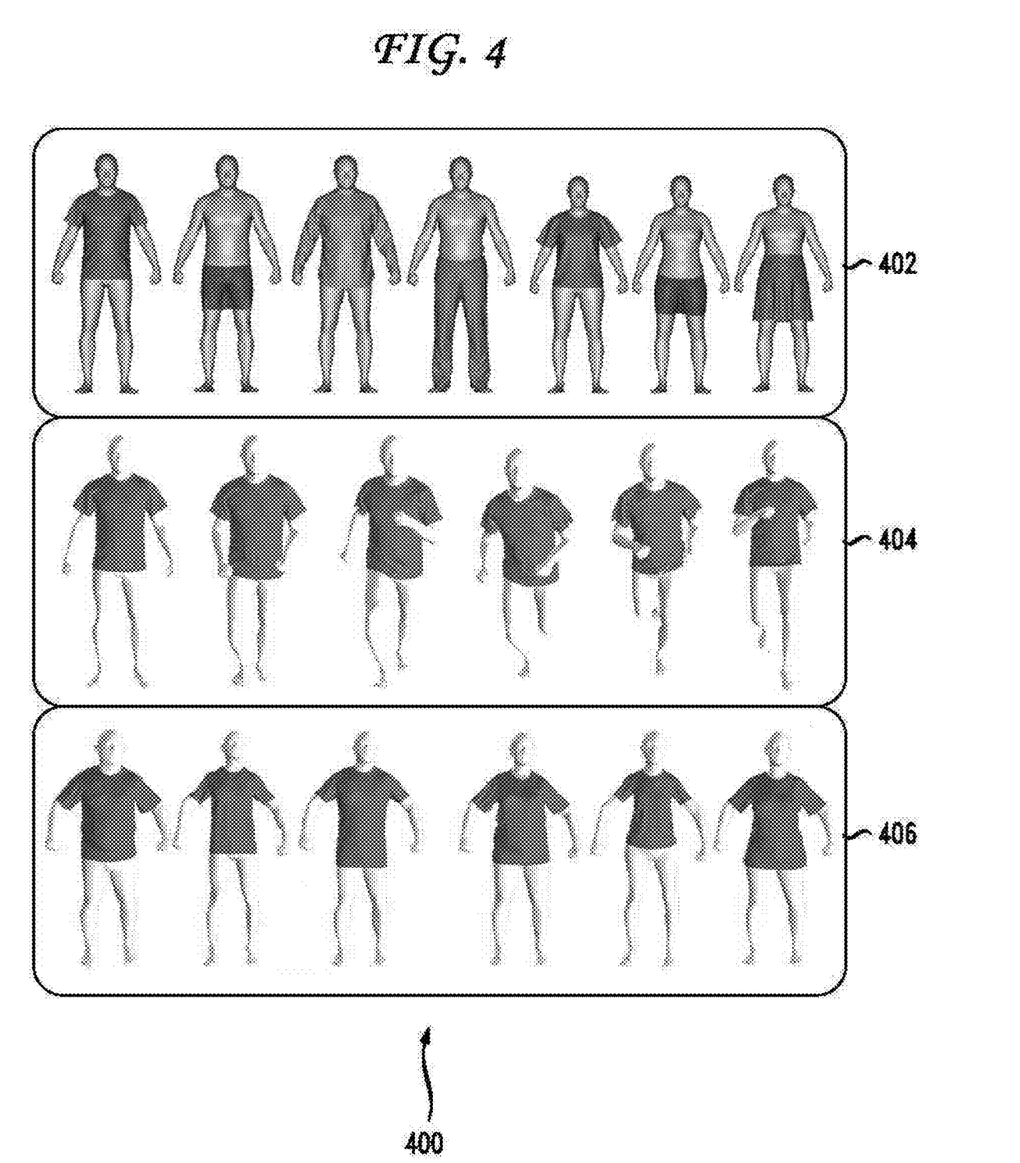
FIG. 4 illustrates an example training set of clothing meshes.

FIG. 4 illustrates an example training set 400 of clothing meshes. The training set 400 can be used for a learned model. The learned model can define how clothing appearance varies with underlying body shape and pose. To this end, the learned model can analyze clothing in different sizes and/or for different body shapes and poses, to see how the clothing drapes and how its shape varies. In some embodiments, the system can represent a piece of clothing as a triangulated mesh with a learned model of how that mesh deforms. In a triangle deformation model, the clothing meshes in different contexts (poses and shapes) can be placed in perfect alignment for greater accuracy. To this end, simulated clothing, which can be easier to place in perfect alignment, can be used to generate the training set 400.

A garment expert can design a series of 2D patterns in different sizes for the T-shirt, which include the major pieces of the T-shirt, such as the front, back, and sleeves. These patterns can be in real measurements, for example, and can share the same "grading rules." The garment can be defined by a number of "grading points" with curves passing through these points according to the grading rules. The grading points can be thought of as special boundary points which characterize the sizes and curves of patterns, for example. In some embodiments, the process of defining the graded garment for a full range of sizes can be performed using a commercial clothing design and 3D simulation software system, such as OPTITEX INTERNATIONAL software, for example.

The training set 400 in FIG. 4 includes graded patterns 402 for T-shirts, shorts, long-sleeved shirts, long pants, and skirts, which are shown on male and female avatars. In some aspects, simulation can include manually selecting the appropriate size garment for the avatar and positioning the clothing pieces in 3D. The simulation software can then stitch the garment and perform a simulation that results in a realistic looking model with natural wrinkles.

To obtain training data of clothing in multiple poses, the SCAPE model can be used to generate a pose training set 404, including average male and female body shapes as avatars. Clothing simulation can then be performed on the avatars to generate different motion sequences for the pose training set 404. The pose training set 404 can have various body poses, including walking, running, jumping, kicking, turning, cat-walking, bending legs, dancing, gesturing, and so forth. For each motion sequence and avatar, several clothing types can be simulated, such as T-shirt, shorts, skirt, long sleeves, long pants, sweater, and so forth. In some embodiments, the training set 400 can include more than 3500 different poses, and 4 male and 3 female garments, with a total of 3500×7=24,500 clothing instances. Other embodiments can include more or less clothing instances. A model of each clothing type can be learned separately. Moreover, as further described below, the learned DRAPE model can combine upper and lower body clothing models to produce combinations not seen in training.

The SCAPE model can also be used to generate a shape training set 406, including males and females with a variety of different body shapes for the training set 400. Each body in the shape training set 406 is illustrated in the same canonical "template" pose. The shape training set 406 can include a T-shirt, shorts, long sleeves, and/or long pants for each male model, and a T-shirt, shorts, and/or a skirt for each female model. In some embodiments, the shape training set 406 can include 4 male garments and 3 female garments, with a total of 60×7=420 clothing instances. However, other embodiments can include more or less clothing instances.

In some embodiments, a 2D size can be selected as the template clothing pattern for the learned model. All other 2D patterns can then be aligned to the template 2D size selected. Alignment can be done to ensure that a given type of clothing has the same mesh topology regardless of gender. The 2D alignment procedure can make use of the fact that the grading points are in correspondence. After 2D alignment, the 3D meshes for each type of clothing are also in full correspondence.

Figure 5:
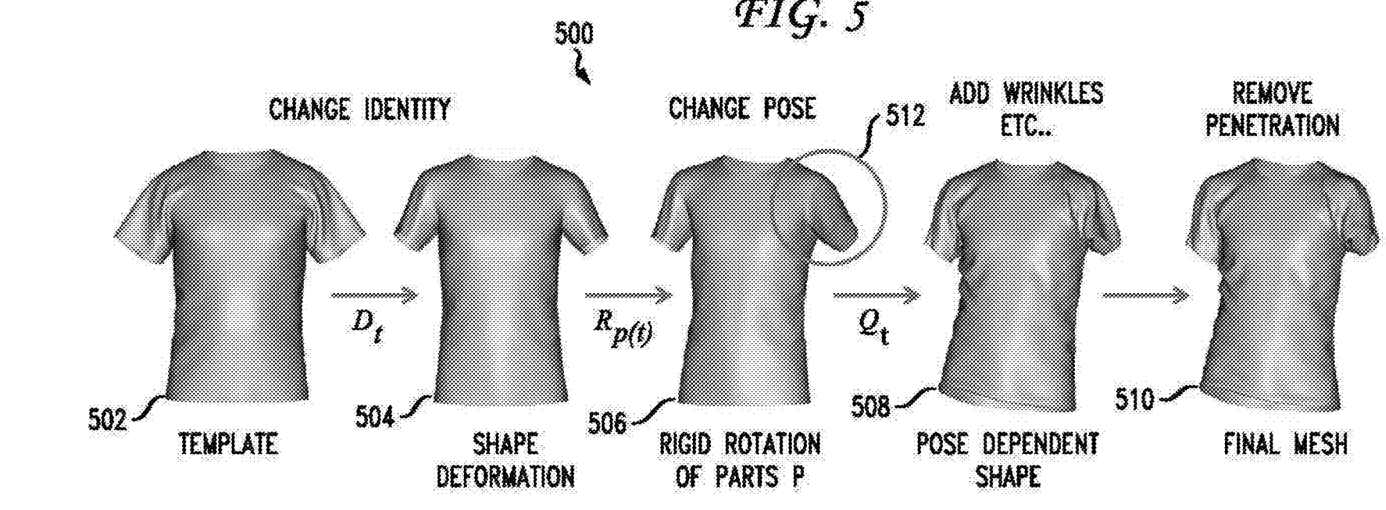
FIG. 5 illustrates an example clothing deformation process.

FIG. 5 illustrates an example clothing deformation process 500. As described in the previous section, the system can obtain a data-set of aligned 3D clothing meshes including a template mesh X, a set of example meshes Y ∈ P, from the same subject as the template but in different poses, and a set of example meshes Y ∈ S, from different individuals of different shape but in the same pose as the template. Y ∈ P can be obtained by running clothing simulation on an animated body. X can be obtained by taking the clothing mesh corresponding to the first frame of P. Y ∈ S can be obtained by running clothing simulation on different bodies with the same pose as the template. Males and females can be considered separately.

It can be important to choose an appropriate representation for deformations between example meshes. Simple choices based on vertex coordinates or vertex displacements from the template mesh 502 can have difficulties in separating deformations induced by different causes. Since factorization is an aspect of the model, shape deformation gradients can be used in some embodiments. This allows the learned model to separate deformations induced by pose and shape, and then combine the deformations together.

Deformation gradients are linear transformations that align corresponding triangles between a source mesh X and a target mesh Y, each with T triangles. Suppose the vertices of a given triangle t in X are $(\vec{\chi}_{t,1}, \vec{\chi}_{t,2}, \vec{\chi}_{t,3})$ and the corresponding triangle in Y has the vertices $(\vec{Y}_{t,1}, \vec{Y}_{t,2}, \vec{Y}_{t,3})$, given two meshes, a 3 by 3 linear transformation $A_t$ can be represented by Equation 1 as follows:

$$A_t[\Delta \vec{\chi}_{t,2}, \Delta \vec{\chi}_{t,3}, \Delta \vec{\chi}_{t,4}] = [\Delta \vec{Y}_{t,2}, \Delta \vec{Y}_{t,3}, \Delta \vec{Y}_{t,4}], \text{ where } \Delta \vec{\chi}_{t,k} = \vec{\chi}_{t,k} - \vec{\chi}_{t,1} \text{ for } k=2, 3 \text{ and } \Delta \vec{\chi}_{t,4} = \Delta \vec{\chi}_{t,2} \times \Delta \vec{\chi}_{t,3}.$$

Equation 1:

Since $A_t$ is applied to edge vectors, it is translationally invariant: it encodes the scale, orientation, and skew of triangle t. Following the virtual edge, $\Delta \vec{\chi}_{t,4}$, makes the problem well constrained so that we can solve for $A_t$.

The factored model expresses the deformations $A_t$ as a series of linear transformations, each corresponding to different aspects of the model. There are many ways to factor $A_t$. For example, $A_t$ can be factored with factors related to pose-dependent deformations, rigid part rotations, and body shape as illustrated in Equation 2, below:

$$A_t = Q_t R_{p(t)} D_t.$$

Equation 2:

$D_t$ can correspond to the variations in clothing shape on different people, and can be triangle specific. $R_{p(t)}$ can be a rigid rotation, which can be applied to the clothing part p containing triangle t. $Q_t$ can be the non-rigid pose-dependent deformation of the garment, and can also be triangle specific. This pose-dependent term can include the effects of muscle deformation, but can be dominated by wrinkles resulting from bending and twisting.

Moreover, new meshes can be constructed by applying different transformations $Q_t$, $D_t$, and $R_{p(t)}$. The deformations can be applied to triangles independently. A target mesh can be reconstructed by solving the vertex coordinates $\vec{y}_i \in Y$, that best match the deformed triangles in a least squares sense, as illustrated below in Equation 3:

$$\operatorname*{argmin}_{\vec{y}_1,...,\vec{y}_v} \sum_{t=1}^{T} \sum_{k=2,3} \|Q_t R_{p(t)} D_t \Delta \chi_{t,k} - \Delta y_{t,k}\|^2.$$

Equation 3

In FIG. 5, the various deformations are illustrated in the following order. First, a template mesh 502 is selected and a shape deformation 504 is applied to the selected template mesh 502. Then, a rigid pose deformation 506 followed by a pose-dependent deformation 508 are applied to get the synthesized piece of clothing, the final mesh 510, that is then refined to fit the body. The various deformations are described in greater detail below.

Deformations Due to Body Shape

The shape deformations $D_t$ can be learned from X and S. Since the examples in S have the same pose as X, the $A_t$'s for each pair of X and $Y^j \in S$ can be solved using Equation 1. These deformations can be induced by changes in clothing shape that result from the clothing being draped over different body shapes, so $Q_t R_{p(t)}$ in Equation 2 can be the identity, and for a given mesh $y^j \in S$, $A_t^j = D_t^j$. The clothing shape deformations $D_t^j$ for all triangles t in T can be concatenated into a single column vector $\vec{d}^j \in R^{3 \cdot 3 \cdot T \times 1}$. Every example $y^j$ in S can be combined to get a matrix of deformations $S-[\ldots, \vec{d}^j, \ldots]$. Principal component analysis (PCA) can then be used to find a low dimensional subspace, such that $\vec{d}^j$ can be approximated by $U_d \vec{\phi}^j + \vec{\mu}_d$, where $U_d$ are the principal components of the shape deformation space, and $\vec{\mu}_d$ represents the mean deformation from the template X. The first few principal components can capture the major variance of clothing shape deformation.

For a new set of shape coefficients $\vec{\phi}^*$, the concatenated shape deformations can be $\vec{d}^* = U_d \vec{\phi}^* + \vec{\mu}_d$. This can be converted into the appropriate 3×3 deformation matrices, $D_t^*$, which can be applied to the template mesh 502 in shape deformation 504.

The clothing shape parameters, $\vec{\phi}$, can be predicted from a SCAPE body shape parameters, $\vec{\beta}$ in order to automatically dress a new body. The linear mapping between these vectors can be learned using body and clothing training pairs in S. In some embodiments, the linear mapping between these vectors can be learned using 60 body and clothing training pairs in S. This can be calculated by a standard damped least squares regression with L2 regularization and a constant offset dimension. Here, the clothing parameters for an input body shape $\vec{\beta}$ can be determined using the following linear equation:

$$\vec{\phi}^* = w \cdot [\vec{\beta}; 1].$$

Equation 4:

As previously mentioned, the linear mapping between the vectors can be calculated by a standard damped least squares regression. However, the linear mapping between the vectors can also be calculated by other, alternative, regression methods, such as kernel-based linear regression or Gaussian Process regression, for example.

$\hat{D}_t(\vec{\beta})$ can represent the deformation matrix for a triangle t predicted from the body shape.

Deformations Due to Rigid Part Rotation

Figure 7:
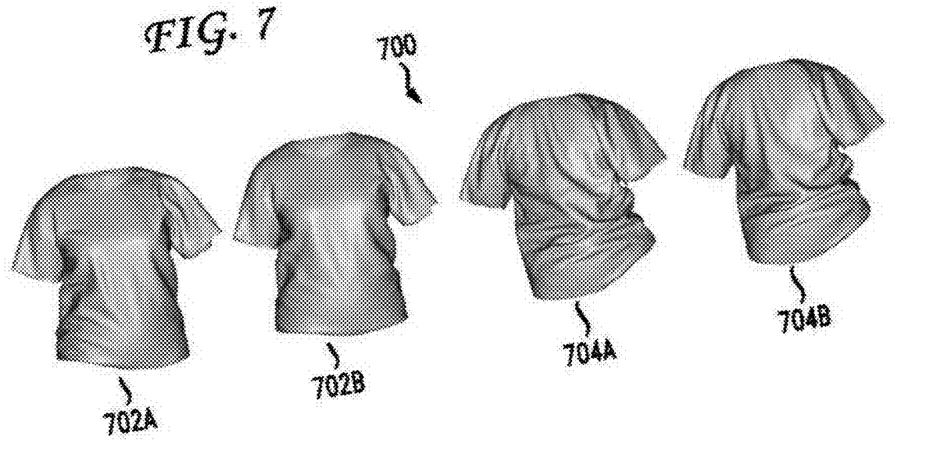
FIG. 7 illustrates example clothing from a learned pose-dependent deformation model.

A naked body that we want to dress can be represented by a SCAPE model, which itself can contain learned body shape deformations, rigid rotations of the parts, and non-rigid deformations related to pose. A body is composed of parts, as shown in FIG. 7. Clothing is also naturally composed of parts, or can be segmented into such parts. Each clothing part can be associated with a body part, as shown in FIG. 7. The correspondences for each garment can be defined manually, as part of the pattern creation process. The SCAPE pose can include the parameters $\vec{\theta}$, which define rigid 3×3 rotations matrices, $R_p$ for each part p, and these in turn apply to all the triangles in the respective body part. These rotations can be applied to the corresponding clothing part. Typically, not all body parts affect every garment, thus the part rotation parameters that are relevant to the clothing can be represented by $\vec{\theta}_c$, and the part-based clothing rotation of a triangle $R_{p(t)}(\vec{\theta}_c)$.

Deformations Due to Body Pose

The pose training set P can be used to learn a non-rigid, pose-dependent clothing deformation model, which can capture effects such as wrinkles, for example. Since every $y^i \in P$ belongs to the same subject, the resulting deformation can be attributed to clothing pose changes. Thus, $D_t$ can be the identity in Equation 2. Moreover, the deformations for each mesh $y^i$ and each triangle can be represented as $A_t^i = R_{p(t)}^i Q_t^i$, where $Q_t^i$ is the residual triangle deformation after accounting for the part-based rigid rotation $R_{p(t)}^i$, given by the training body pose.

Similar to the shape deformation, the clothing pose deformation $Q_t^i$ for the triangles can be concatenated into a single column vector $\vec{q}^i \in R^{3 \cdot 3 \cdot T \times 1}$. Every example $y^i$ can be placed in P to get a matrix P=[ ..., $\vec{q}^i$, ... ]. PCA can be used to represent a reduced subspace of pose deformation, and $\vec{q}^i$ can be approximated by $U_q \vec{\psi}^i + \vec{\mu}_q$.

New deformations can be predicted for new body poses that are not in the training set. Here, non-rigid wrinkle deformations 512, Q, can be expressed as a linear function of pose parameters R. Dynamics can also be embedded into the clothing model, in order to improve the smooth transition of poses, and capture finer wrinkle details, which can enhance the clothing animation. To this end, a second order dynamics model can be generated, and the pose deformation of the current time instance $\vec{\psi}^f$, (here f stands for time instance) can be defined as a function of clothing part rotation of the current time instance $\vec{\theta}_c^f$; the previous two frames of pose deformation, $\vec{\psi}^{f-1}$ and $\vec{\psi}^{f-2}$; the clothing part rotation changes, $\Delta \vec{\theta}_c^{f-2}$, $\Delta \vec{\theta}_c^{f-1,f-2}$, where $\Delta \vec{\theta}_c^{j,k} = \vec{\theta}_c^j - \vec{\theta}_c^k$; and the clothing translation changes, $\Delta \vec{z}^{f,f-2}$ and $\Delta \vec{z}^{f-1,f-2}$, where $\Delta \vec{z}^f$ is the global translation of the underlying body at time instance f and $\Delta \vec{z}^{j,k} = \vec{z}^j - \vec{z}^k$.

Since the pose parameters $\vec{\theta}_c$ correspond to relevant parts, over fitting can be mostly avoided. The T-shirt, $\vec{\theta}_c$, includes relative rotation of torso with respect to the pelvis, relative rotation of left upper arm with respect to the torso, and relative rotation of the right upper arm with respect to the torso. Thus, $\vec{\theta}_c$ for the T-shirt can be represented by a 9×1 vector, with each relevant joint being represented by a 3×1 Rodrigues vector. A dynamics model for each type of clothing per gender can be learned by gathering all the clothing instances from all the pose training sequences for that gender, and solving the following least squares problem to learn dynamics.

$$\underset{M_i, 1 \leq i \leq 7}{\operatorname{argmin}} \sum_{f \in P} \left\| \vec{\Psi}_t - \begin{bmatrix} M_1^T \\ M_2^T \\ M_3^T \\ M_4^T \\ M_5^T \\ M_6^T \\ M_7^T \end{bmatrix}^T \begin{pmatrix} \vec{\theta}_c^f \\ \vec{\psi}^{f-1} \\ \vec{\psi}^{f-2} \\ \Delta \vec{\theta}_c^{f,f-2} \\ \Delta \vec{\theta}_c^{f-1,f-2} \\ \Delta \vec{z}^{f,f-2} \\ \Delta \vec{z}^{f-1,f-2} \end{pmatrix} \right\|^2 \quad \text{Equation 5}$$

Figure 8:
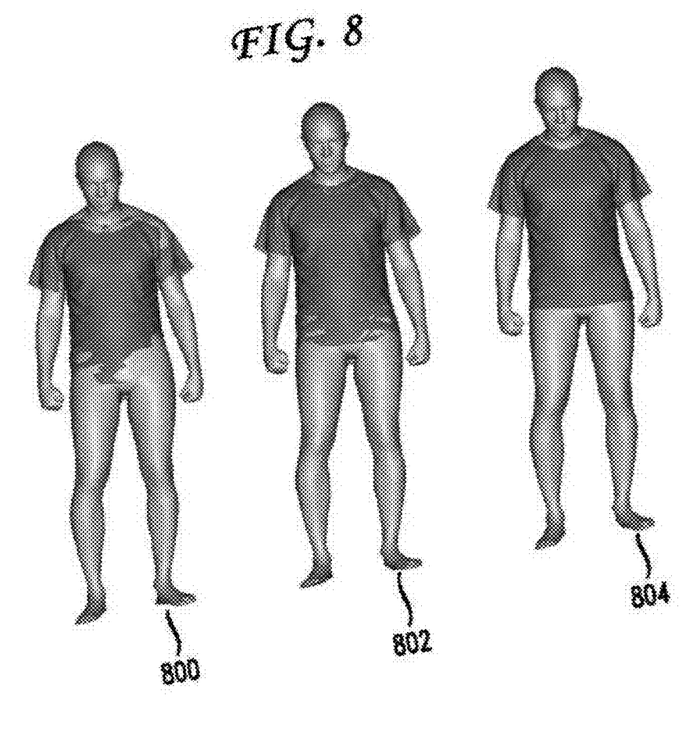
FIG. 8 illustrates example stages of fine tuning.

Note that the first order model (only involves $\vec{\theta}_c^f$ and $M_1$) can be used to boost the first two frames. For a motion sequence with known $\vec{\theta}$'s, which is normally the case, $\Delta \vec{\theta}_c^{j,k}$ can be ascertained before animation. Once $\vec{\psi}$ is predicted, the concatenated pose-dependent deformations can be $\vec{q} = U_q \vec{\psi} + \vec{\mu}_q$. This can then be converted into the appropriate 3×3 deformation matrices. FIG. 8 illustrates an approximation of fine wrinkles produced by the dynamics model.

Furthermore, $Q_t(\vec{\psi}^f)$ can represent the deformation matrix for a triangle t, predicted from the clothing pose, previous frames of clothing, clothing pose changes, and body translation changes.

Figure 6:
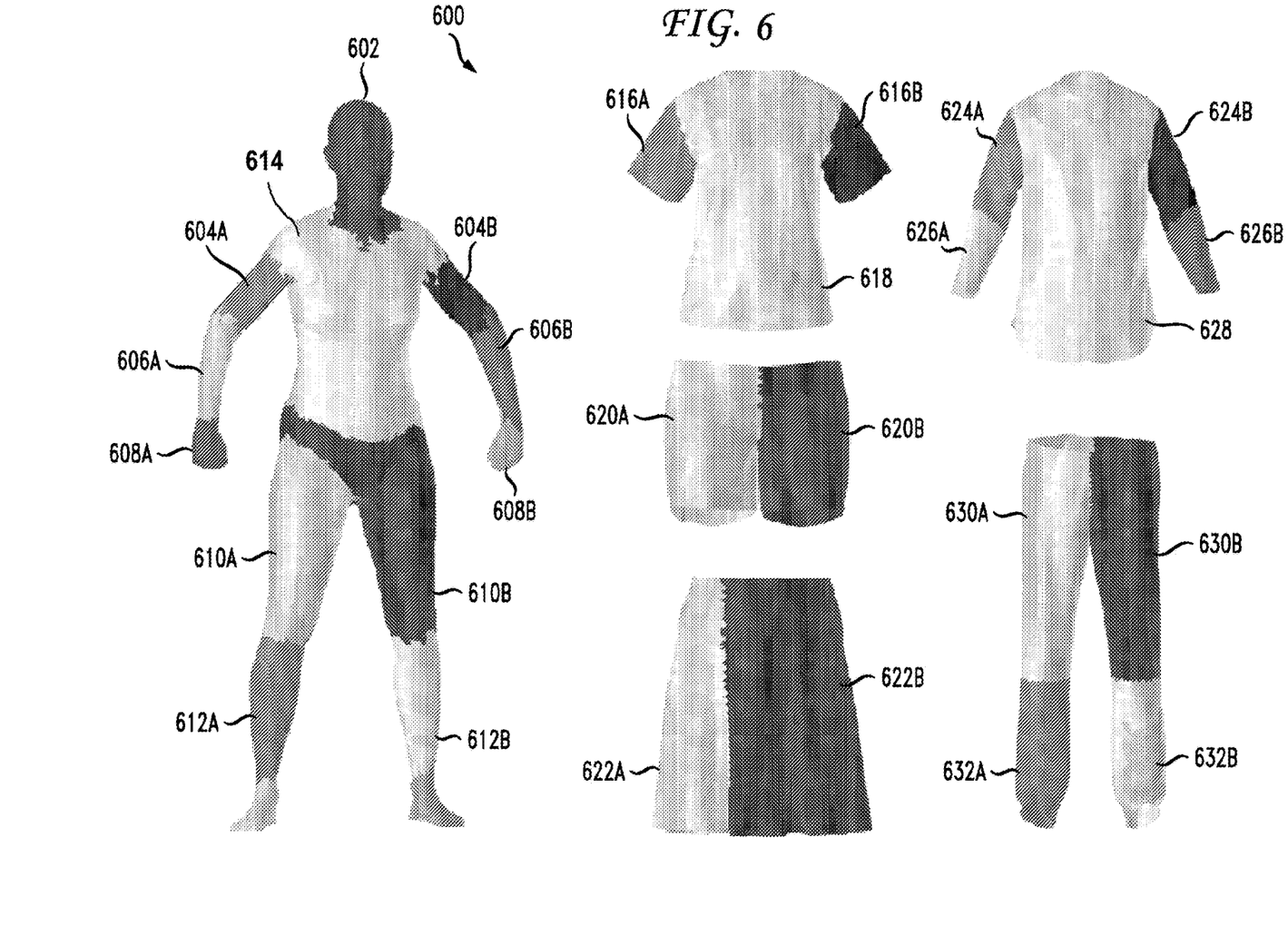
FIG. 6 illustrates example female body and clothing parts.

FIG. 6 illustrates example female body and clothing parts 600. The body includes a head and neck 602, a left upper arm 604A and a right upper arm 604B, a left forearm 606A and a right forearm 606B, a left hand 608A and a right hand 608B, a torso 614, a left upper leg 610A and a right upper leg 610B, and a left lower leg 612A and a right lower leg 612B. The T-shirt includes a torso portion 618 that corresponds to the torso 614, a left sleeve 616A that corresponds to the left upper arm 604A, and a right sleeve 616B that corresponds to the right upper arm 604B. The shorts include a left portion 620A and a right portion 620B, which correspond to the left upper leg 610A and a right upper leg 610B, respectively. Similarly, the skirt includes a left portion 622A and a right portion 622B, which correspond to the left upper leg 610A and a right upper leg 610B, respectively.

The long-sleeve T-shirt includes a torso portion 628 that corresponds to the torso 614, a left sleeve portion 624A that corresponds to the left upper arm 604A, a left forearm portion 626A that corresponds to the left forearm 606A, a right sleeve portion 624B that corresponds to the right upper arm 604B, and a right forearm portion 626B that corresponds to the right forearm 606B. Finally, the long pants include a left upper leg portion 630A that corresponds to the left upper leg 610A, a right upper leg portion 630B that corresponds to the right upper leg 610B, and a left lower leg portion 632A and right lower leg portion 632B, which correspond to the left lower leg 612A and right lower leg 612B, respectively.

As illustrated above, the body parts correspond to specific clothing parts. During training, the rigid rotation of each clothing part can be the same as the rotation for the corresponding body part. This can allow for new body poses to be transferred to the clothing during clothing fitting.

FIG. 7 illustrates example clothing 700 from a learned pose-dependent deformation model. For each pair of clothing 702A-B and 704A-B, the left piece of clothing 702A and 704A shows the physically-simulated example from the pose training set, and the right piece of clothing 702B and 704B shows the synthesized deformation patterns predicted by the learned deformation model based on linear regression. As illustrated, linear regression can produce realistic, and overly smooth wrinkles. The clothing can also fit realistically on the body.

FIG. 8 illustrates example stages of fine tuning. The DRAPE model can provide a clothing mesh that realistically fits on the body. However, in some cases, when the clothing mesh is overlaid on the body, there can be some interpenetration where the clothing falls inside the body. Thus, the initial clothing prediction 800 can include some interpenetration, which can be improved by performing a refinement step. FIG. 8 illustrates the result after the first iteration of optimization 802 and the final result 804 of the refinement step. After each iteration of optimization, the system can recomputed the nearest neighbor relationship between clothing and body vertices, as further detailed below in the description of the refinement step.

The refinement step can warp the garment so that it lies entirely outside the body, by minimizing a measure of cloth-body interpenetration with respect to the vertices of the garment, regularizing to make the cloth deform plausibly. The step of refinement can include a cloth-body interpenetration process, a smooth warping process, a damping process, and/or a tight process, all of which can be applied to make the cloth deform plausibly.

Cloth-body interpenetration can be based on a signed distance to the body mesh, for example. Given a point, the system can identify the nearest vertex on the body and consider the plane defined by that vertex and its associated surface normal. Signed distance to this plane can locally approximate signed distance to the mesh. This distance can be used to define a penalty for clothing points sufficiently outside the body. Here, the penalty can be zero, for example.

$$pc(Y) = \sum_{(i,j) \in c} \rho\left(\varepsilon + \vec{n}_{\vec{b}_j}^T \left(\vec{y}_i - \vec{b}_j\right)\right),$$

where c is the set of correspondences between clothing vertex $\vec{y}_i$, and their closest body vertex $$\vec{b}_j, \rho(x) = \begin{cases} 0 & x \geq 0 \\ x^2/(\sigma^2 + x^2) & x < 0 \end{cases}$$

Penetration happen when $\vec{n}_{\vec{b}_j}^T(\vec{y}_i - \vec{b}_j) < 0$ $\vec{n}_{\vec{b}_j}$ can be the outward-pointing normal for body vertex $\vec{b}_j$, and ε=0.3 cm. The notion of sufficiently outside comes from the ε. Without it, clothing vertices could be as likely to lie just inside the body as just outside.

Smooth warping is another process for making the cloth deform plausibly. This process can allow the warping of the cloth vertices to vary smoothly over the surface of the garment. This can be done by minimizing:

$$s(Y) = \sum_{i \in V} \left\| \left(\vec{y}_i - \tilde{\vec{y}}_i\right) - \frac{1}{|N_i|} \sum_{j \in N_i} \left(\vec{y}_j - \tilde{\vec{y}}_j\right) \right\|^2$$

where $\vec{y}$ are vertices of the warped garment, $\tilde{\vec{y}}_j$ are vertices of the original model garment before collision handling, V is the set of vertices in the garment, and $N_i$ is the set of vertices adjacent to vertex i.

Damping allows the warped vertices keep their original locations as much as possible. Here, this can be done by minimizing:

$$d(Y) = \sum_{i \in V} \left\| \vec{y}_i - \tilde{\vec{y}}_i \right\|^2.$$

Tight can be an optional process to ensure plausibly warping for clothing that requires waist band attaching to the body. There are several clothing types, such as shorts, skirts, and long pants, that can require waist band attaching to the body. "Tight" is specifically designed to deal with this situation. This can be formulated as:

$$t_c(Y) = \sum_{(i,j) \in C \wedge i \in T} \left\| \vec{y}_i - \vec{b}_j \right\|^2$$

where T is a set of clothing waist band vertices defined by the pattern designer. This term specifies that for every waist band vertex, it should be close to its nearest neighbor on the body.

One common feature of "smooth warping," "damping," and "tight" is that they are all in the quadratic error form, and inside the quadratic error form, the equations are linear to the warped clothing vertices $\vec{y}_i$. Therefore, these three terms can fit into a least squares formulation. On the other hand, "cloth-body interpenetration" has an asymmetric error function p(x). Thus, the collision term in this scenario cannot take a symmetric error function, since the definition of "penetration" is asymmetric, with vertices falling on one side being penetrating, and the other side being non-penetrating. Nevertheless, "cloth-body interpenetration" can be approximated as such:

$$\vec{p}c(Y) = \sum_{(i,j) \in C \wedge i \in P} \left\| \varepsilon + \vec{n}_{\vec{b}_j}^T \left(\vec{y}_i - \vec{b}_j\right) \right\|^2,$$

where P are the vertices that currently penetrate. Since $\vec{p}c(Y)$ is an approximation without taking into account the current non-penetrating vertices, we can solve collision handling iteratively, allowing little change for every iteration. This way, new penetrating vertices that did not penetrate in the last iteration can be avoided. In some embodiments, three iterations can be enough to remove collision. In other embodiments, more or less than three iterations can be performed to remove collision. The collision handling step can be as such:

Given underlying body, compute nearest neighbor relationship C.
   iter=0
   repeat
   iter=iter+1
   Determine the penetration vertex set P.
   Construct a linear system and solve:

$$\operatorname*{argmin}_{\vec{y}_1, \ldots, \vec{y}_V} \left\{ \vec{p}c(Y) + \lambda_s s(Y) + \lambda_d d(Y) + \lambda_t t_c(Y) \right\} \text{ until iter} = 3.$$

until iter=3.

Gradually decreasing weights can be used for $\lambda_s$=4, 2, 1 and $\lambda_d$=0.8, 0.6, 0.4, and if the clothing type is lower-clothing with tight waist band, either constant $\lambda_t$=0.2 or $\lambda_t t_c(Y)$ can be used.

The deformation model is translationally invariant, so there is a three-dimensional global translation degree of freedom to solve the global translation. In some embodiments, for upper-clothing types (e.g., T-shirt and long sleeves), 20 points can be used on the shoulders of the body (each shoulder gets 10 points) as the anchor points. Since the clothing meshes are aligned, it is easy to define 20 points on the shoulders of the clothing as well. To determine the translation degree of freedom, the clothing mesh can be translated such that those anchor points overlap as much as possible. For lower-clothing types (e.g., shorts, skirt, and long pants), 20 points can be used around the waist of the body and the waist of clothing as the anchor points, and the clothing can be translated to make them overlap. Other embodiments can use more or less than 20 points on the shoulders and/or around the waist.

Dynamics

It should be understood that the dynamics model used for clothing can also be applied to human body shape. Previous methods for modeling pose dependent deformation (e.g., SCAPE) do not model dynamics of soft tissue such as fat and muscle. This is because training data of 3D meshes over time (i.e., 4D data) has not existed. We now have a 4D scanner and the ability to collect moving sequences of 3D bodies and hence can train a dynamics model to more realistically represent human shape in motion.

Fit Preferences

As described here, a DRAPE model can be based on 3D body shapes that were dressed in 3D clothing that was determined by an expert to fit well. This can be extended to dress each body in several sizes of clothing to capture the fact that individual have different fit preferences. A user of the system can then specify their fit preference or see a range of fits displayed on the body model, for example. Fit preference can become an axis (or set of axes) in the low dimensional space of clothing shapes, allowing fit to be varied graphically or procedurally along these axes.

Sizing Real Clothing

If the underlying body model used for sizing clothing corresponds to a real human, then there can be several ways of finding real clothes that fit them. DRAPE can predict a unique clothing shape for every body. This is in contrast to the discrete set of shapes represented by the grading patterns. One way to fit a person to clothing automatically is to take the estimated DRAPE garment and find the closest matching shape among the graded patterns. The distance between the garments can be computed in several ways, either in 2D or 3D; for example based on Euclidean contour distance in 2D. This distance can be used to select the garment with the smallest distance, or possibly the next larger size depending on how tight the person likes their clothing. Moreover, this distance between the DRAPE prediction and a given true clothing shape can be used to tell a person whether that size will fit or not. A numeric measure of "goodness of fit" can be provided based on this distance. More fine-grained measures can also be obtained to, for example, say that a particular size is likely to be tight at the waist and loose at the hips.

Finally, DRAPE can provide the foundation for truly custom clothing. Most custom clothing solutions extract standard tailoring measurements from the body. These are used in a standard process to design a pattern for the individual. DRAPE can allow a different, novel, approach. Once a 3D garment is sized for a person, it can generate immediately a corresponding 2D pattern. Thus, DRAPE can be used to print a pattern that is unique for every body shape.

It should be clear that DRAPE can be an important part of a complete solution for retail and custom clothing, for example. A shopper can obtain a 3D body model from any source (e.g., laser scanning, mm-wave scanning, Kinect/range scanning, entry of hand-made measurements, model-based fitting to images, stereo and structured light, etc.). The shopper can then select a type of garment and their body can be immediately dressed in the appropriate size. They can also alter the size based on fit preference. The garment can then be viewed by simulating the body in motion. The user can select one of several motion sequences and watch how the clothing moves on their body. If it is a retail application, the best matching size can be selected and a fit rating can be given to the shopper to let them know how well it is predicted to fit. If it is a custom application, a unique pattern can be generated and this pattern can be transferred to a custom clothing manufacturing facility.

DRAPE can be used for dressing people in a variety of shapes, poses, and clothing types. Moreover, the DRAPE parametric clothing model can be factored, so that clothing shape is a function of body pose and shape. DRAPE can be learned from standard 2D clothing designs simulated on 3D avatars with varying shape and pose. The factored nature of DRAPE can make training practical by reducing the amount of training sequences required. Once learned, DRAPE can adapt to different body shapes and poses without the redesign of clothing patterns; this effectively creates infinitely-sized clothing. Here, the method can be automatic. In particular, animators do not need to place the cloth pieces in appropriate positions to dress an avatar. During fitting, the body-cloth interpenetration problem can be solved by minimizing a carefully designed cost function that can be optimized efficiently. DRAPE can offer a significant speedup over traditional physics-based simulation, for example. The experimental results illustrate how DRAPE can produce realistic virtual clothing that preserve not only general clothing shapes, but also details such as wrinkles.

While DRAPE is described in some examples as a model that is based on an underlying SCAPE body, it should be understood that DRAPE can be more general. Any 3D body model can be used under DRAPE. For example, to use a body model, the vertices of the model can be labeled as segmented parts, the rotation of the parts can be determined (if not known, this can be computed trivially given the labeled parts), and the body shape can be defined by some features. In the case of SCAPE, the body shape parameters are the coefficients, but any other descriptor can also be used. For example, standard body measurements can be used to learn the mapping from body shape to DRAPE shape.

While the factored model can require less training data, training data can be generated with different body shapes in different motion sequences. With such data, a multi-linear or non-linear model of clothing shape can be trained. For example, a mixture of linear experts can be used to predict clothing shape from body shape and pose. This approach can increase the realism and accuracy of the wrinkles. The only part of the model that has to change is the prediction of clothing shape from the body shape. Additionally body shape can be added into the dynamics model and implemented with a mixture of linear experts. In this way, heavy bodies can produce different wrinkle dynamics than thin bodies. In some sense, a strict form of multiple-linear-models is generated in the division between men and women. This can be extended to have different weights and make the division between the linear models "soft."

The model can also be trained with a wider range of fabric types. With additional training data and different fabric properties, a model where fabric properties are explicit parameters can be learned. Moreover, more complex garments can be simulated with tucked-in shirts, pleats, cuffs, collars, and closures (buttons and zippers). For some of these, a computation may have to be performed to determine whether they self-penetrate, and this can increase the running time of the fitting process.

Another way to deal with tucked-in garments is to split them into pieces so, for example, a shirt could be represented by an upper portion that is relatively unaffected by the lower portion. This can allow reusing the upper part for with multiple lower parts.

To layer multiple pieces of clothing, all the pieces of clothing can be independently predicted and positioned, and later refined from the inside out. For example, a pair of pants and a T-shirt can first be independently predicted and positioned. The pants can then be refined to be outside the body, and the T-shirt can be refined to be outside the combined vertex of the set of pants and body (in this case, the nearest neighbor C can be computed between the upper-clothing and the combined vertex set). To compute the union of two meshes, the body mesh can be modeled as a graph. Here, if the inner layer is lower-clothing, the edges that are associated with the body waist vertices can be cut to make the body graph un-connected (e.g., a connected component beyond the waist and a connected component below the waist). A bread first search can then be executed, starting from any vertex on the head, for example. The union of the body and lower-clothing can be the vertices that are reachable from the head vertex plus the lower-clothing vertices.

Figure 9:
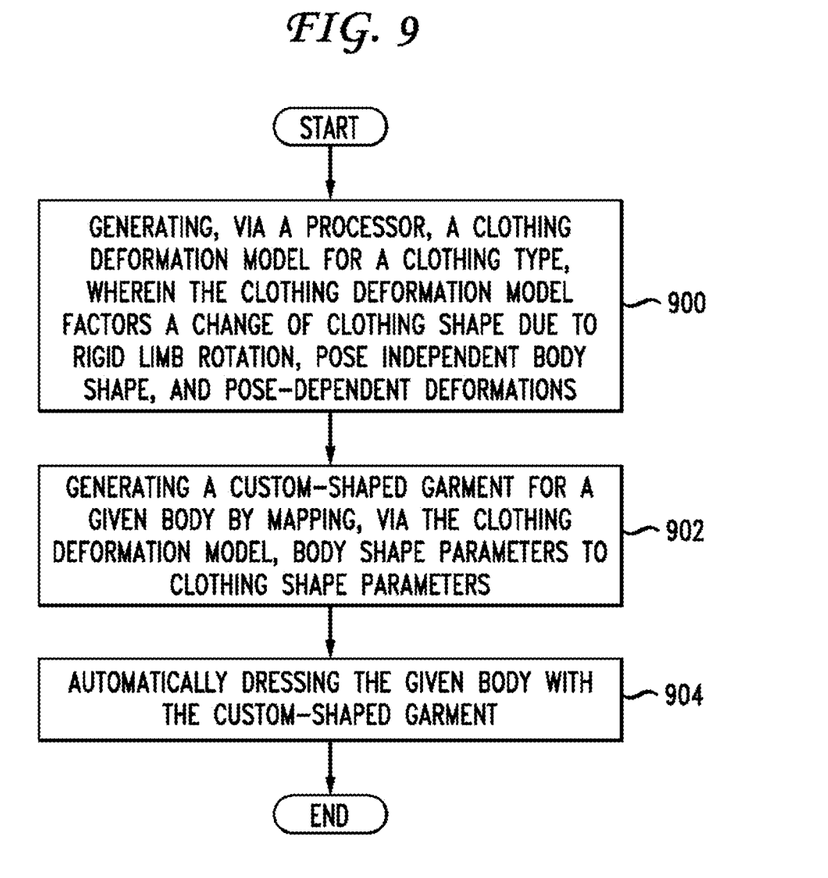
FIG. 9 illustrates an example method embodiment.

Having disclosed some basic system components and concepts, the disclosure now turns to the example method embodiment shown in FIG. 9. For the sake of clarity, the method is described in terms of example system 100, as shown in FIG. 1, configured to practice the method. The steps outlined herein are illustrative and can be implemented in any combination thereof, including combinations that exclude, add, or modify certain steps.

The system 100 can generate a clothing deformation model for a clothing type, wherein the clothing deformation model factors a change of clothing shape due to rigid limb rotation, pose-independent body shape, and pose-dependent deformations (900). Next, the system 100 can generate a custom-shaped garment for a given body by mapping, via the clothing deformation model, body shape parameters to clothing shape parameters (902). The given body can be a model of a human body, such as a parameterized model of a human body with known shape and pose parameters. For example, the given body can be a SCAPE model used to represent the naked body. The custom-shaped garment can be the same type as the clothing type. For example, if the clothing deformation model is for a T-shirt, then the custom-shaped garment can be a T-shirt as well. The clothing type can include a T-shirt, a long-sleeved shirt, a skirt, a sweater, a coat, a jacket, a costume, an undershirt, shorts, long pants, and so forth.

The system 100 can then automatically dress the given body with the custom-shaped garment (904). The given body can be automatically dressed by simulating realistic clothing on the given body without manual intervention. When automatically dressing the given body, the custom-shaped garment can be warped to lay entirely outside the given body. For example, the custom-shaped garment can be warped by minimizing a measure of cloth-body interpenetration with respect to vertices associated with the custom-shaped garment and/or regularizing the custom-shaped garment to make the custom-shaped garment deform plausibly. The system 100 can also perform a refining step, as described previously in the discussion of FIG. 8.

The clothing deformation model allows realistic clothing to be simulated on any body and in any pose. Moreover, the clothing deformation model can automatically adapt to the given body and any other new bodies. For example, in some embodiments, the system 100 can generate, via the clothing deformation model, custom-shaped garments for a plurality of bodies having a plurality of shapes and poses. The system 100 can then automatically dress the plurality of bodies with the custom-shaped garments. In some aspects, the system 100 can automatically generate the custom-shaped garments based on the clothing deformation model and a plurality of parameters of the bodies, for example. Further, the custom-shaped garments can include various clothing types. Thus, the clothing deformation model can be applied to automatically generate realistic clothing simulations for any number of different bodies, with any number of different shapes, in any number of different poses, and any number of different clothing types.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:
1. A method comprising:
   operating, at a retail site, a clothing deformation model for a clothing type, the clothing deformation model generated, via a processor, such that the clothing deformation model factors:

non-rigid deformations, dependent on body pose parameters, learned from a first training set comprising one or more human bodies wearing the clothing type in various poses; and pose-independent clothing shape variations, dependent on body shape and clothing size parameters, learned from a second training set having human bodies with different shapes wearing the clothing type in a same pose; and generating, based on the clothing deformation model, three-dimensional clothing shape data for dressing, via the retail site, an input human body, the three-dimensional clothing shape data determined by mapping input human body parameters associated with the input human body to clothing shape parameters of the clothing type, based on a combination of the non-rigid deformations and the pose-independent clothing shape variations.

2. The method of claim 1, wherein the non-rigid deformations are part of a pose-dependent clothing deformation model and wherein the first training set comprises a pose training set having the one or more human bodies wearing the clothing type in the various poses.

3. The method of claim 1, wherein the non-rigid deformations are learned from rigid rotation of cloth pieces.

4. The method of claim 1, wherein the input human body is automatically dressed with clothing learned from simulated clothing data.

5. The method of claim 1, wherein the input human body comprises a parameterized model of a human body with known shape and pose parameters.

6. The method of claim 1, wherein the clothing deformation model automatically adapts to new bodies.

7. The method of claim 1, wherein the non-rigid deformations are composed of rigid rotations combined with learned deformations.

8. The method of claim 1, wherein dressing the input human body comprises simulating realistic clothing on the input human body without manual intervention.

9. The method of claim 1, wherein the clothing deformation model allows realistic clothing to be simulated on a plurality of characters or bodies and in any pose.

10. The method of claim 1, wherein the clothing type comprises at least one of a T-shirt, a long-sleeved shirt, a skirt, a sweater, a coat, a jacket, an undershirt, shorts, or long pants.

11. The method of claim 1, wherein dressing the input human body comprises warping a resulting clothing shape to lay entirely outside the input human body.

12. The method of claim 11, wherein the warping of the resulting clothing shape comprises minimizing a measure of cloth-body interpenetration with respect to vertices associated with the resulting clothing shape.

13. The method of claim 12, wherein warping the resulting clothing shape further comprises regularizing the resulting clothing shape to make the resulting clothing shape deform plausibly.

14. The method of claim 1, further comprising:

based on the clothing deformation model, generating custom-shaped garments for a plurality of bodies having a plurality of shapes and poses; and dressing the plurality of bodies with the custom-shaped garments.

15. A retail system comprising:

a processor; and a computer-readable storage device storing instructions which, when executed by the processor, cause the processor to perform operations comprising:

operating, at the retail system, a clothing deformation model for the clothing type, the clothing deformation model generated such that the clothing deformation model factors:

non-rigid deformations, dependent on body pose parameters, learned from a first training set comprising one or more human bodies wearing the clothing type in various poses; and pose-independent clothing shape variations, dependent on body shape and clothing size parameters, learned from a second training set having human bodies with different shapes wearing the clothing type in a same pose; and generating, based on the clothing deformation model, three-dimensional clothing shape data for dressing, via the retail system, an input human body, the three-dimensional clothing shape data determined by mapping the input human body parameters associated with the input human body to clothing shape parameters of the clothing type based on a combination of the non-rigid deformations and the pose-independent clothing shape variations.

16. The system of claim 15, wherein the non-rigid deformations are part of a pose-dependent clothing deformation model and wherein the first training set comprises a pose training set having the one or more human bodies wearing the clothing type in the various poses.

17. The system of claim 15, wherein the non-rigid deformations are learned from rigid rotation of cloth pieces.

18. The system of claim 15, wherein the input human body is automatically dressed with clothing learned from simulated clothing data.

19. The system of claim 15, wherein the input human body comprises a parameterized model of a human body with known shape and pose parameters.

20. The system of claim 15, wherein the clothing deformation model automatically adapts to new bodies.

* * * * *